United States Patent
Carmeli et al.

(10) Patent No.: US 11,587,567 B2
(45) Date of Patent: Feb. 21, 2023

(54) USER UTTERANCE GENERATION FOR COUNTERFACTUAL ANALYSIS AND IMPROVED CONVERSATION FLOW

(71) Applicant: International Business Machines Corporation, Armonk, NY (US)

(72) Inventors: Boaz Carmeli, Koranit (IL); Ateret Anaby Tavor, Givat Ada (IL); Eyal Ben-David, Kibutz Yagur (IL)

(73) Assignee: International Business Machines Corporation, Armonk, NY (US)

(*) Notice: Subject to any disclaimer, the term of this patent is extended or adjusted under 35 U.S.C. 154(b) by 193 days.

(21) Appl. No.: 17/207,673

(22) Filed: Mar. 21, 2021

(65) Prior Publication Data
US 2022/0301558 A1  Sep. 22, 2022

(51) Int. Cl.
| | |
|---|---|
| *G10L 15/22* | (2006.01) |
| *G10L 15/18* | (2013.01) |
| *G10L 15/16* | (2006.01) |
| *G06F 16/36* | (2019.01) |
| *G06F 40/30* | (2020.01) |
| *G06F 40/35* | (2020.01) |
| *G06F 40/56* | (2020.01) |

(52) U.S. Cl.
CPC ............ *G10L 15/22* (2013.01); *G10L 15/16* (2013.01); *G10L 15/1822* (2013.01); *G06F 16/36* (2019.01); *G06F 16/367* (2019.01); *G06F 40/30* (2020.01); *G06F 40/35* (2020.01); *G06F 40/56* (2020.01); *G10L 15/1815* (2013.01); *G10L 2015/225* (2013.01)

(58) Field of Classification Search
None
See application file for complete search history.

(56) References Cited

U.S. PATENT DOCUMENTS

| | | | |
|---|---|---|---|
| 10,229,683 B2 * | 3/2019 | Leeb | G10L 15/18 |
| 10,757,043 B2 * | 8/2020 | Gershony | H04L 51/18 |
| 11,158,307 B1 * | 10/2021 | Ghias | G06N 3/0445 |

(Continued)

OTHER PUBLICATIONS

Samant et al., "Framework for Deep Learning-Based Language Models Using Multi-Task Learning in Natural Language Understanding: A Systematic Literature Review and Future Directions", IEEE, Feb. 16, 2022.*

(Continued)

*Primary Examiner* — Richard Z Zhu
(74) *Attorney, Agent, or Firm* — Gregory J Kirsch

(57) ABSTRACT

Embodiments may determine user intent in conversations with dialogue systems so as to improve the quality of such conversations and to reduce the number of failed conversations. For example, a method may comprise receiving, at a dialogue system, a first text utterance from a user, generating a plurality of second text utterances at the dialogue system in response to the received text utterance, generating a third text utterance based on each generated second text utterance using a trained deep neural network model, generating a score indicating a quality of each conversation, wherein each conversation includes the first text utterance, one of the second text utterances, and the third text utterance based on the one of the second text utterances, and outputting to the user the second text utterance included in the conversation having the highest quality score.

15 Claims, 7 Drawing Sheets

(56) References Cited

U.S. PATENT DOCUMENTS

| | | | |
|---|---|---|---|
| 11,314,940 B2* | 4/2022 | Ray | G06F 40/30 |
| 11,373,045 B2* | 6/2022 | Bealby-Wright | G06N 5/027 |
| 2019/0066668 A1* | 2/2019 | Lin | G06N 5/027 |
| 2019/0205386 A1 | 7/2019 | Kumar | |
| 2020/0075019 A1* | 3/2020 | Steelberg | G10L 15/30 |
| 2020/0227025 A1* | 7/2020 | DiMascio | G10L 15/22 |
| 2020/0365146 A1 | 11/2020 | Adiba | |
| 2022/0028371 A1* | 1/2022 | Xu | G10L 15/22 |
| 2022/0147719 A1* | 5/2022 | Stoyanchev | G06F 40/35 |

OTHER PUBLICATIONS

Bird, Jordan & Ekárt, A. & Faria, Diego. (Oct. 2020). Chatbot Interaction with Artificial Intelligence: Human Data Augmentation with T5 and Language Transformer Ensemble for Text Classification, Research Gate, https://www.researchgate.net/publication/344639389.

Tiha, Anjana. (2018). Intelligent Chatbot using Deep Learning. 10.13140/RG.2.2.14006.75841, Research Gate, https://www.researchgate.net/publication/328582617.

Marco Troisi, (2020). The key to chatbot success: High-quality conversations, TechBeacon, https://techbeacon.com/app-dev-testing/key-chatbot-success-high-quality-conversations.

Qu, Chen and Yang, Liu and Croft, W. Bruce and Zhang, Yongfeng and Trippas, Johanne R. and Qiu, Minghui (Mar. 2019) User Intent Prediction in Information-seeking Conversations, Proceedings of the 2019 Conference on Human Information Interaction and Retrieval ACM, http://dx.doi.org/10.1145/3295750.3298924.

Hancock, Braden, Bordes, Antoine, Mazare, Pierre-Emmanuel, Weston, Jason (Jul. 2019). Learning from Dialogue after Deployment: Feed Yourself, Chatbot!, Proceedings of the 57th Annual Meeting of the Association for Computational Linguistics, Association for Computational Linguistics, https://www.aclweb.org/anthology/P19-1358/.

Shaoxiong Feng, Xuancheng Ren, Hongshen Chen, Bin Sun, Kan Li, Xu Sun (Oct. 2020). Regularizing Dialogue Generation by Imitating Implicit Scenarios, https://arxiv.org/abs/2010.01893.

* cited by examiner

USER UTTERANCE GENERATION FOR COUNTERFACTUAL ANALYSIS AND IMPROVED CONVERSATION FLOW

BACKGROUND

The present invention relates to techniques to utilize a sequence-to-sequence deep neural network model to learn to generate user utterances and predict conversation quality in a human to bot dialogue setting Goal oriented dialogue systems have become a prominent customer-care interaction channel for most businesses. However, not all interactions are smooth, and customer intent misunderstanding is a major cause of dialogue failure. Conversation data is complex and includes many data variants. The main reason for sub-optimal and failed conversations may be attributed to bot's misinterpretation of user request, that is, the user's information need or intent.

Typically, users express their intent at the beginning of the conversation, and the bot reacts with its most suitable response. Bot responses are dependent on user intents. Ultimately, an accurate bot response depends on its ability to correctly understand the intent. Bot misunderstanding of the user intent will most probably lead to an unsatisfactory response, which in turn will cause the user to react accordingly. For example the user might ask for a human agent, express negative sentiment, or rephrase the request.

Conventional solutions use some kind of intent prediction. In these solutions interpreting user needs is based, in naïve implementations, on analyzing the last utterance provided by the user, and in more sophisticated implementations, on analyzing the full conversation context, available till the point of prediction.

Accordingly, a need arises for improved techniques to determine user intent in conversations with dialogue systems so as to improve the quality of such conversations and to reduce the number of failed conversations.

SUMMARY

Embodiments may provide improved techniques to determine user intent in conversations with dialogue systems so as to improve the quality of such conversations and to reduce the number of failed conversations. For example, embodiments may utilize a sequence-to-sequence deep neural network model, such as Text to Text Transfer Transformer (T5), to learn to generate user utterances and predict conversation quality in a human to bot dialogue setting. Embodiments may use this model for assessing end-to-end conversation quality. Embodiments may further apply the utterance generation capability for improving bot responses in run-time by generating counterfactual user utterances and then predicting conversation quality based on these utterances. The bot may then be directed to interpret user needs based on the most promising counterfactual flow. Embodiments may score of conversation based on three utterances, the user's utterance, the bot's response, and a third utterance generated by a model trained to predict user response to the first two utterances. Such embodiments may provide better results than embodiments that take only the first one utterance, or the first two utterances, into account.

For example, in an embodiment, a method may be implemented in a computer system comprising a processor, memory accessible by the processor, and computer program instructions stored in the memory and executable by the processor, and the method may comprise receiving, at a dialogue system, a first text utterance from a user, generating a plurality of second text utterances at the dialogue system in response to the received text utterance, generating a third text utterance based on each generated second text utterance using a trained deep neural network model, generating a score indicating an accuracy of predicting an intent of the user based on the first text utterance, one of the second text utterances, and the third text utterance based on the one of the second text utterances the first text utterance, one of the second text utterances, and the third text utterance based on the one of the second text utterances, and outputting to the user the second text utterance included in the conversation having the highest quality score.

The method may further comprise selecting as a user intent the one of the predicted intents upon which the second text utterance included in the conversation having the highest quality score is based. The trained deep neural network model may be trained using domain data including at least one of user-dialogue system conversation logs and user-human conversation logs. The trained deep neural network model may be fine-tuned using at least one of intent prediction data, conversation assessment data, and generated third text utterances. The trained deep neural network model is fine-tuned using at least one of repetition of utterances, reordering of utterances, and escalation of a conversation.

In an embodiment, a system may comprise a processor, memory accessible by the processor, and computer program instructions stored in the memory and executable by the processor to perform receiving, at a dialogue system, a first text utterance from a user, generating a plurality of second text utterances at the dialogue system in response to the received text utterance, generating a third text utterance based on each generated second text utterance using a trained deep neural network model, generating a score indicating a quality of each conversation, wherein each conversation includes the first text utterance, one of the second text utterances, and the third text utterance based on the one of the second text utterances, and outputting to the user the second text utterance included in the conversation having the highest quality score.

In an embodiment, a computer program product may comprise a non-transitory computer readable storage having program instructions embodied therewith, the program instructions executable by a computer, to cause the computer to perform a method that may comprise receiving, at a dialogue system, a first text utterance from a user, generating a plurality of second text utterances at the dialogue system in response to the received text utterance, generating a third text utterance based on each generated second text utterance using a trained deep neural network model, generating a score indicating a quality of each conversation, wherein each conversation includes the first text utterance, one of the second text utterances, and the third text utterance based on the one of the second text utterances, and outputting to the user the second text utterance included in the conversation having the highest quality score.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments may provide improved techniques to determine user intent in conversations with dialogue systems so as to improve the quality of such conversations and to reduce the number of failed conversations. For example, embodiments may utilize a sequence-to-sequence deep neural network model, such as Text to Text Transfer Transformer (T5), to learn to generate user utterances and predict conversation quality in a human to bot dialogue setting. Embodiments may use this model for assessing end-to-end conversation quality. Embodiments may further apply the utterance generation capability for improving bot responses in run-time by generating counterfactual user utterances and then predicting conversation quality based on these utterances. The bot may then be directed to interpret user needs based on the most promising counterfactual flow. Embodiments may score of conversation based on three utterances, the user's utterance, the bot's response, and a third utterance generated by a model trained to predict user response to the first two utterances. Such embodiments may provide better results than embodiments that take only the first one utterance, or the first two utterances, into account.

Embodiments may take dialogue context into account to improves intent prediction. Embodiments may train a text-to-text model using a multi-task regime, in which the secondary task is used to predict the succeeding user utterance, which further improves the main task of intent prediction. Further, embodiments may generate a successive user utterance and use it as a look-ahead signal to improves prediction in inference time where the real utterance is not yet available.

It is to be noted that embodiments of the present techniques may receive text from a user, such as chat app text, text messages, email messages, etc., which may be received by a dialogue system or "bot" that may generate a textual response that is then sent to the user using similar media. Likewise, embodiments of the present techniques may receive voice signals from a user, such as from phone calls, and the voice signals may be converted to text for processing the bot. Likewise, the textual responses generated by the bot may be converted to speech and sent to the user.

Figure 1:
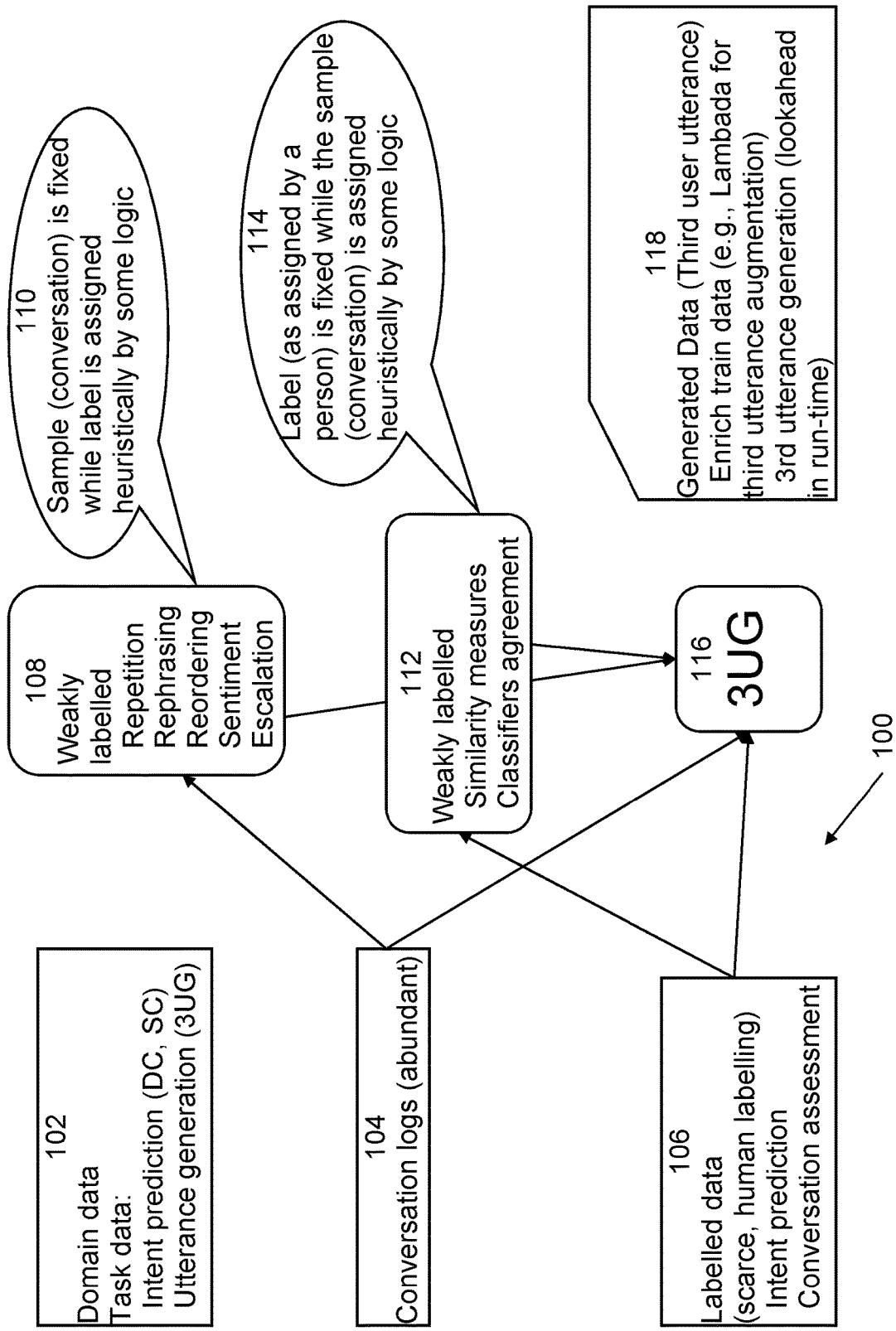
FIG. 1 illustrates exemplary supervised, unsupervised and weakly supervised data according to embodiments of the present techniques.

An exemplary embodiment of user utterance generation data is shown in FIG. 1. In this example, embodiments may utilize a model that is first pre-trained using a data-rich environment and then fine-tuned on a downstream task. For example, data that may be used may include domain data for pretraining and task data, such as intent prediction data and utterance generation data, for fine-tuning. Such data may include unlabeled data, such as user-dialogue system conversation logs 104, which is abundant, and labeled data 106, such as human labeled data, which is scarce, such as intent prediction data and conversation assessment data. Unlabeled data, such as user-dialogue system conversation logs 104 may be weakly labeled 108, based on factors such as repetition, rephrasing, reordering, sentiment, and escalation. For example, a sample, such as a conversation may be fixed while one or more label may be assigned heuristically by some logic, resulting in weakly labeled data. Likewise, human labeled data 106 may also be weakly labeled 112. Here, labels, as assigned by a person, may be fixed while the sample (conversation) may be assigned heuristically by some logic 114 based on, for example, similarity measures and classifiers agreement. All this data, that is, conversation logs 104, weakly labeled data 108, labeled data 106, and weakly labeled data 112, may be input to third user utterance generation (3UG) block 116, which may generate data 118 such as enriched training data (e.g., Lambada for third utterance augmentation) and third utterance generation (lookahead in run-time).

Dialogue representation relies on a complex data structure, composed of multiple utterances, generated alternately by two actors: user and bot. The number of utterances in a dialogue varies dramatically and so does the length of each utterance. To cope with this complexity, and given that the intent classification task benefits from generating user utterances, embodiments may utilize a flexible text-to-text model that supports multi-task training by design.

An example of a text-to-text model that may be used by the present techniques is the Text-to-Text Transfer Transformer (T5) system, which supports multi-training regimes via an encoder-decoder architecture and language-modeling training. In T5, all tasks are mapped into text-in text-out format. Specifically, the model resolves classification tasks by generating the predicted class' label. The model is thus able to use the same loss function and parameter weights across different tasks, data sets, and training regimes.

Figure 2:
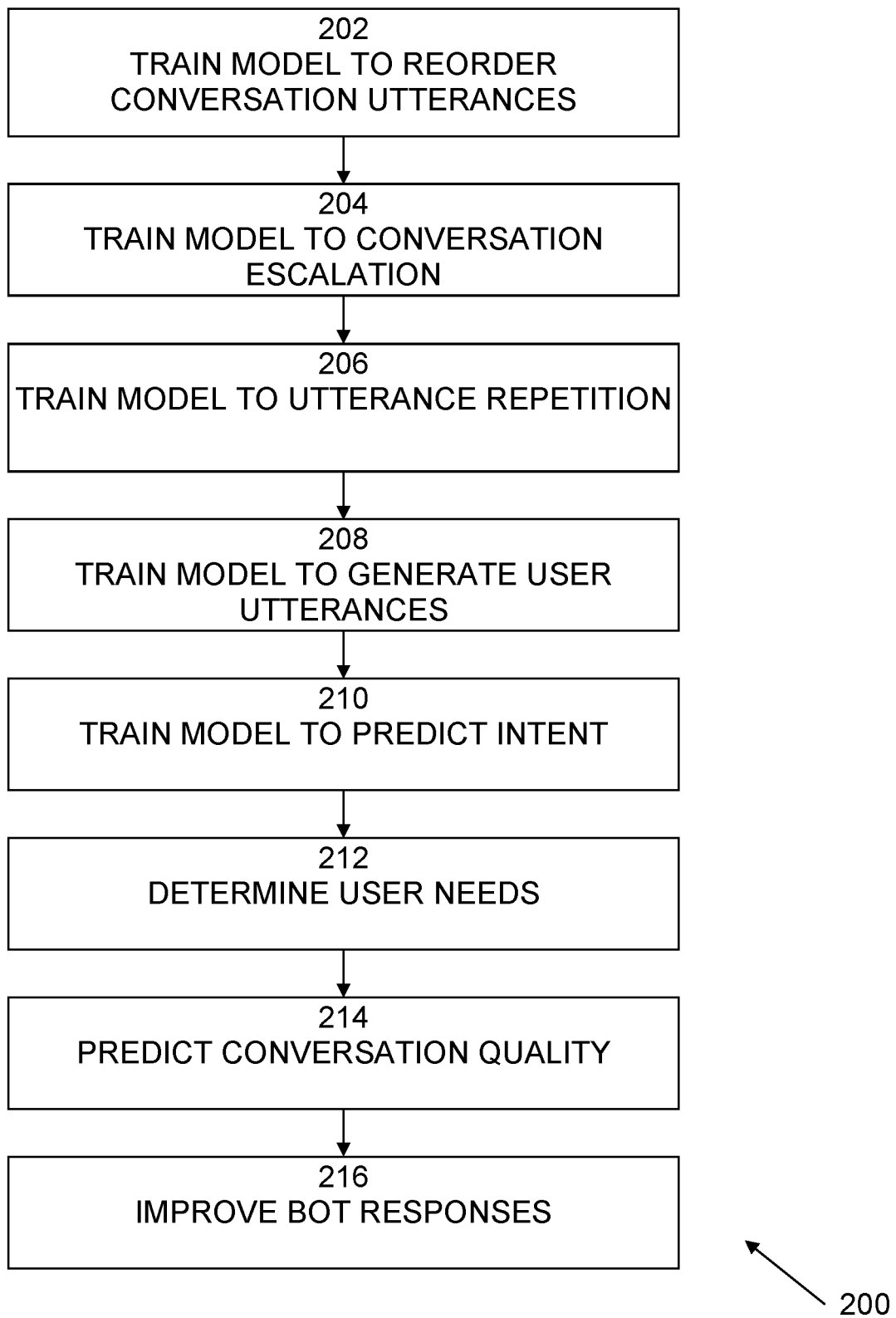
FIG. 2 an exemplary flow diagram of a process of user utterance generation according to embodiments of the present techniques.
Figure 4:
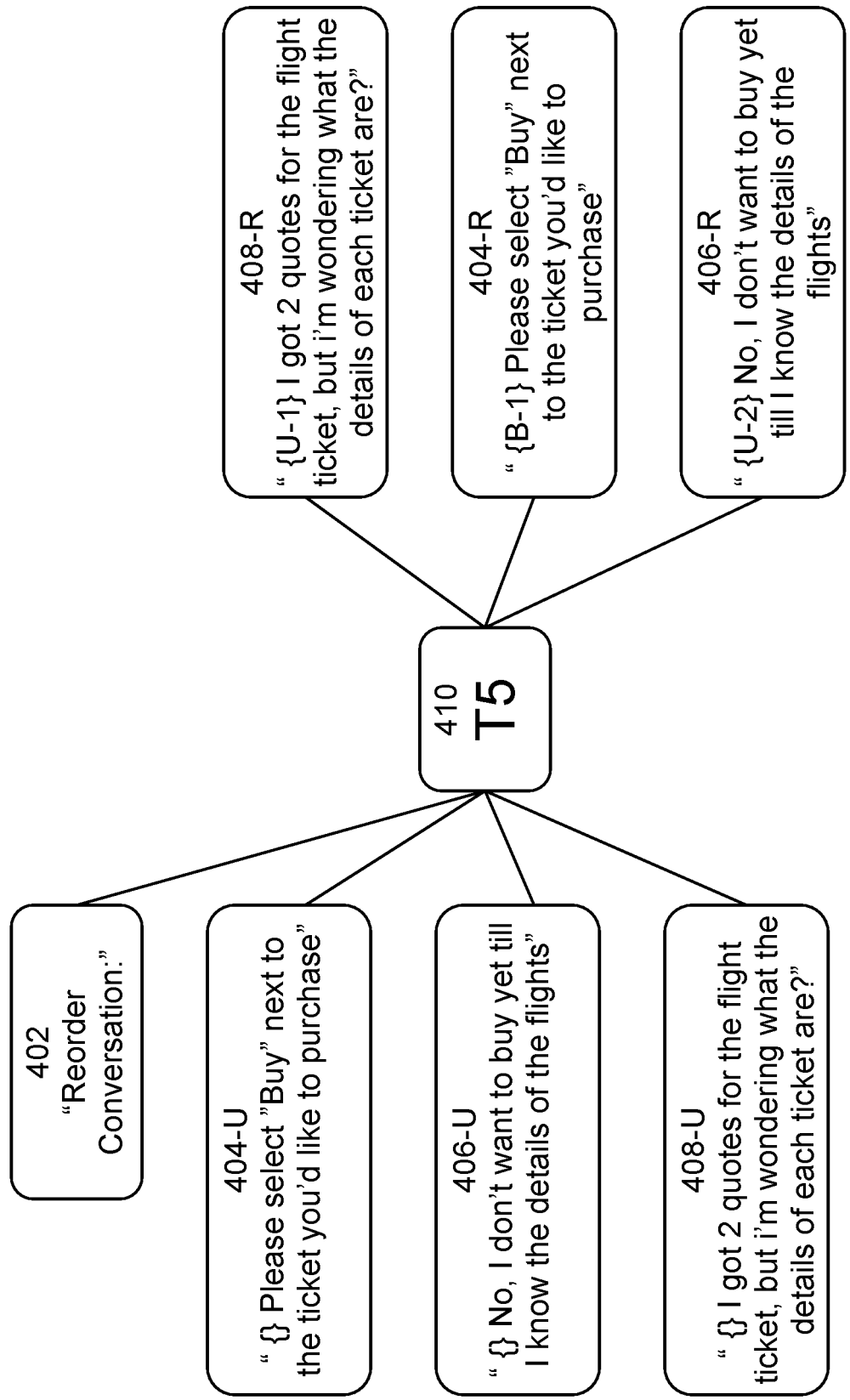
FIG. 4 is an exemplary illustration of reordering of conversation utterances according to embodiments of the present techniques.

An exemplary flow diagram of a process 200 of user utterance generation according to embodiments of the present techniques is shown in FIG. 2. It is to be noted that 202-208 may be performed in arbitrary order. Process 200 begins with 202, in which a model may be trained to reorder conversation utterances. For example, utterances may be shuffled and the model may be trained to correctly reorder the utterances. An example of utterance reordering is shown in FIG. 4. In this example, the function performed 402 is "Reorder Conversation:". The input data may include unordered utterances 404-U, 406-U, 408-U. The input data 404-U, 406-U, 408-U may be input to the trained model 410, such as T5, which may reorder the utterances 408-R, 404-R, 406-R, and label them with the entity, user or bot, that they belong to.

At 204, a model may be trained to perform conversation escalation. For example, the model may be trained to predict false if the bot contains the entire conversation and true if the conversation was eventually handled by a human agent. At 206, a model may be trained to perform utterance repetition prediction. For example, the model may predict true for repetitive bot utterances or rephrased user utterances, and false otherwise.

At 208, a model may be trained to generate user utterances. For example, a generative task may be defined to predict the third user utterance from a given first user utterance and successive bot response. This task may be referred to as 3UGG. To train the model, such as a T5 model, on this task, a large amount of unlabeled data may be used, such as data that is continuously generated and logged by the dialogue system during interaction with users. Alternatively, dialogue data from user to human-agent interactions may be used in situations where data from dialogue systems does not exist.

Figure 3:
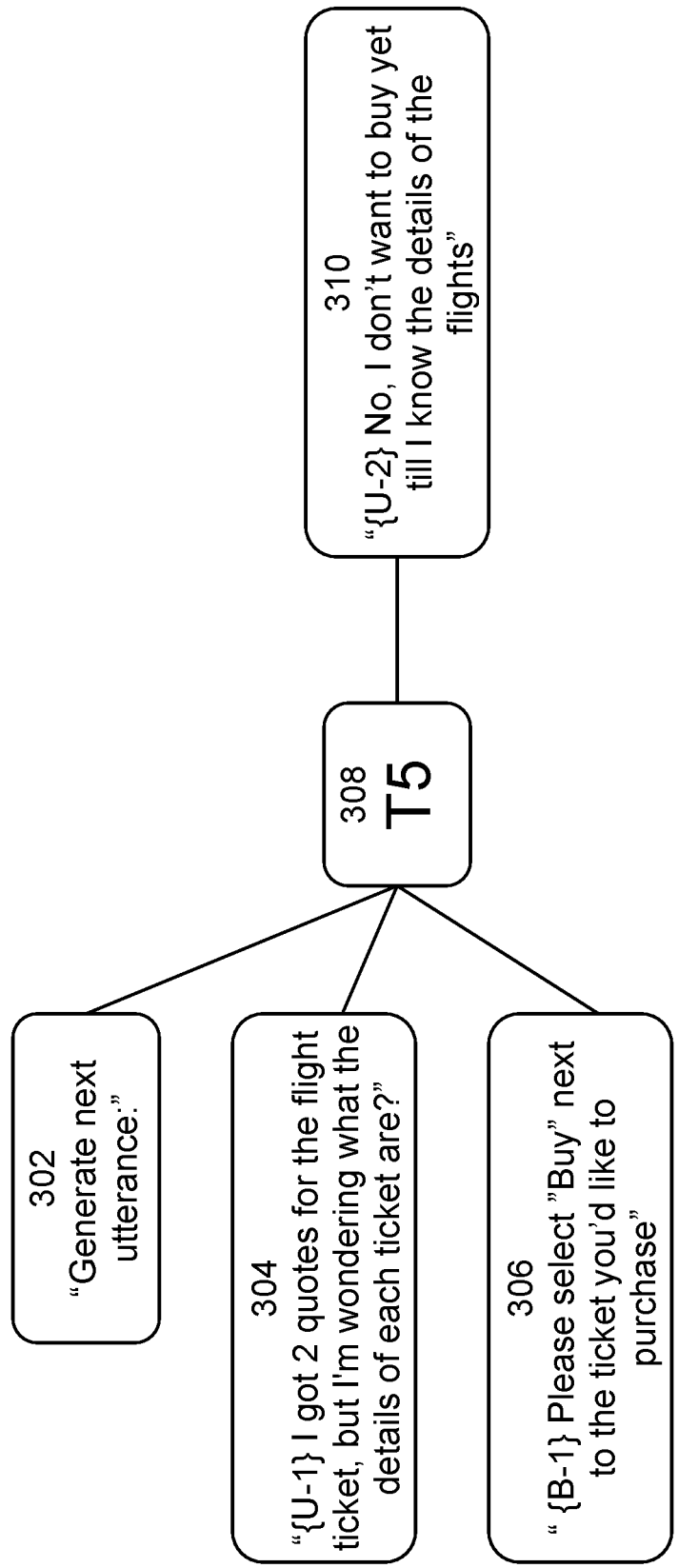
FIG. 3 is an exemplary illustration of user utterance generation according to embodiments of the present techniques.

An example of user utterance generation is shown in FIG. 3. In this example, the function performed 302 is "Generate next utterance:". The input data may include a first user utterance 302 {U-1}, such as "{U-1} I got 2 quotes for the flight ticket, but I'm wondering what the details of each ticket are?", and a first bot utterance 306 {B-1}, such as "{B-1} Please select "Buy" next to the ticket you'd like to purchase". The input data 304, 306 may be input to the trained model 308, such as T5, which may generate a second user utterance 310 {U-2}, "{U-2} No, I don't want to buy yet till I know the details of the flights".

Embodiments may utilize the intrinsic synergy between intent classification and utterance generation tasks. For example, the model may be trained on the supervised full-dialogue dataset alone or, to utilize the synergy, the model may be trained on both the supervised dataset and the unsupervised dataset used for successive utterance generation.

At 210, a model may be trained to predict intent, such as contextual intent. For example, embodiments may utilize dialogue context to improve the intent prediction. In an embodiment, semantic utterance classification (SUC), the model may be trained on just the first user-utterance from each dialogue. In an embodiment, semantic dialogue classification (SDC), the model may be trained on, at least three successive utterances. For low data regimes, embodiments may enrich the supervised dialogue data with a weak supervision signal. For example, two or more classifiers may be trained on the available supervised dataset and then used to predict the intent for unlabeled conversations. Samples may be added to the supervised train set for which the two or more classifiers agreed on the predicted intent. To measure the model's ability to correctly understand the intent, embodiments may utilize a full-dialogue test set. Each dialogue in this dataset may include at least three successive utterances that pertain to the same user intent. The model's accuracy may be measured by classifying one, two, and three initial utterances from each dialogue in the dataset.

At 212, the trained models may be used to determine the most likely needs of the user. For example, user needs may be interpreted based on the most promising counterfactual flow, as described below. At 214, the model may further be used to predict conversation quality in a human to bot dialogue setting and to assess end-to-end conversation quality. Second and third utterances may be generated to aid in predicting conversation quality, as described below. At 216, the utterance generation capability may be used to improve bot responses in run-time. For example, counterfactual user utterances may be generated and then conversation quality may be predicted based on these utterances.

Embodiments may use various weak labeling techniques to add labels to the raw dialogue data for each of these tasks. Embodiments may then use these semi-supervised datasets together with the supervised full-dialogue dataset and the unsupervised dialogue data to train a T5 model to predict the user intent.

Figure 5:
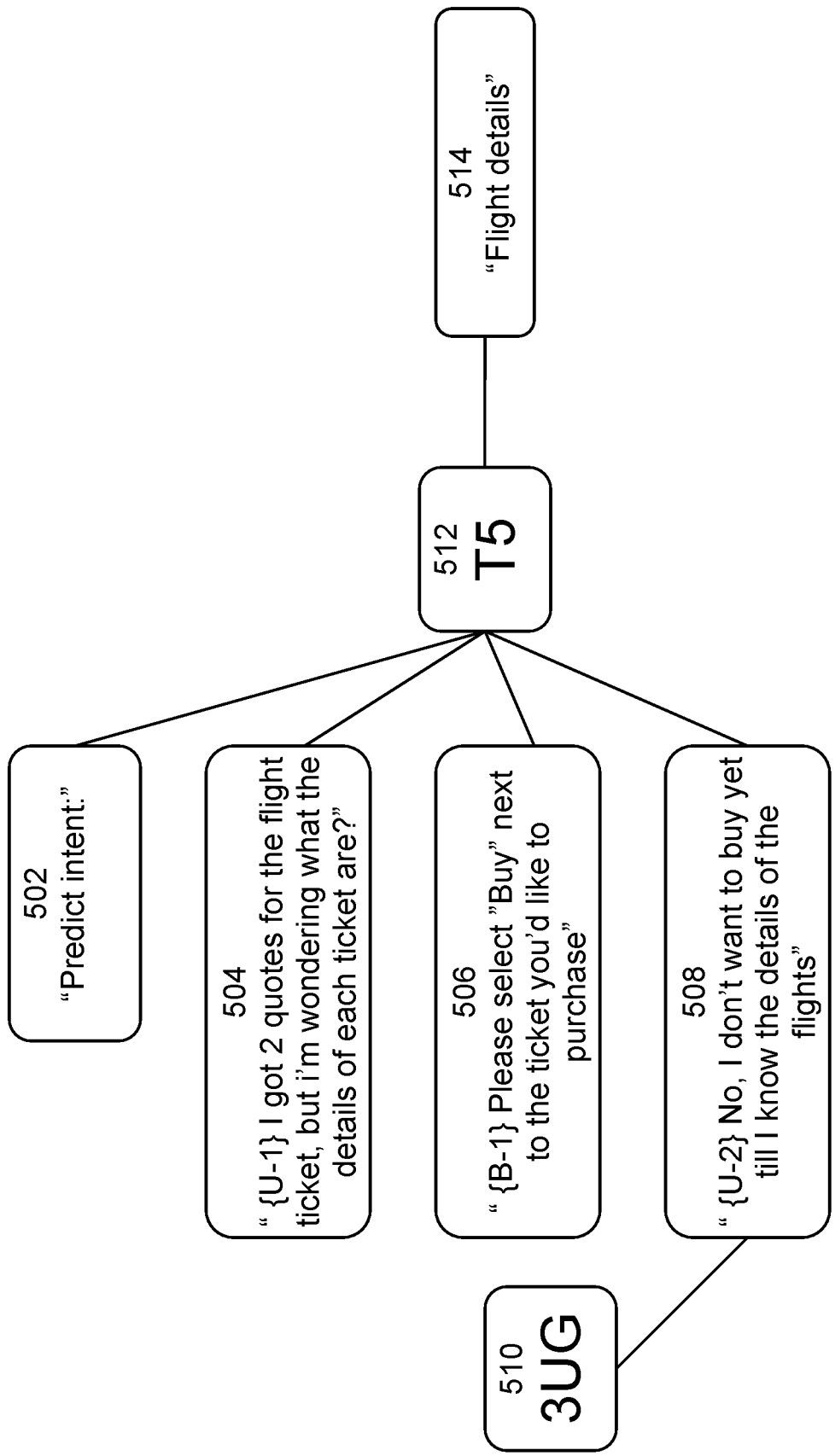
FIG. 5 is an exemplary illustration of intent prediction at inference time according to embodiments of the present techniques.

Embodiments may provide improved intent prediction performance at inference time, while the dialogue is taking place. For example, as shown in FIG. 5, the first available utterance may be complemented with additional utterances as follows. In this example, the function performed 502 is "Predict intent". The input data may include utterance 504, the first user utterance. The dialogue system may be used to get the bot response, the second utterance, utterance 506, generated by the bot. The model already-trained on the 3UGG task may be used to generate a successive user utterance, conditioned upon the first user utterance and the bot response, utterance 508, which is a second user utterance generated by the 3UGG model 510. The utterances 504, 506, 508 may form the input data 5 input to the trained model 512, such as T5, which may generate a predicted intent 514.

Figure 6:
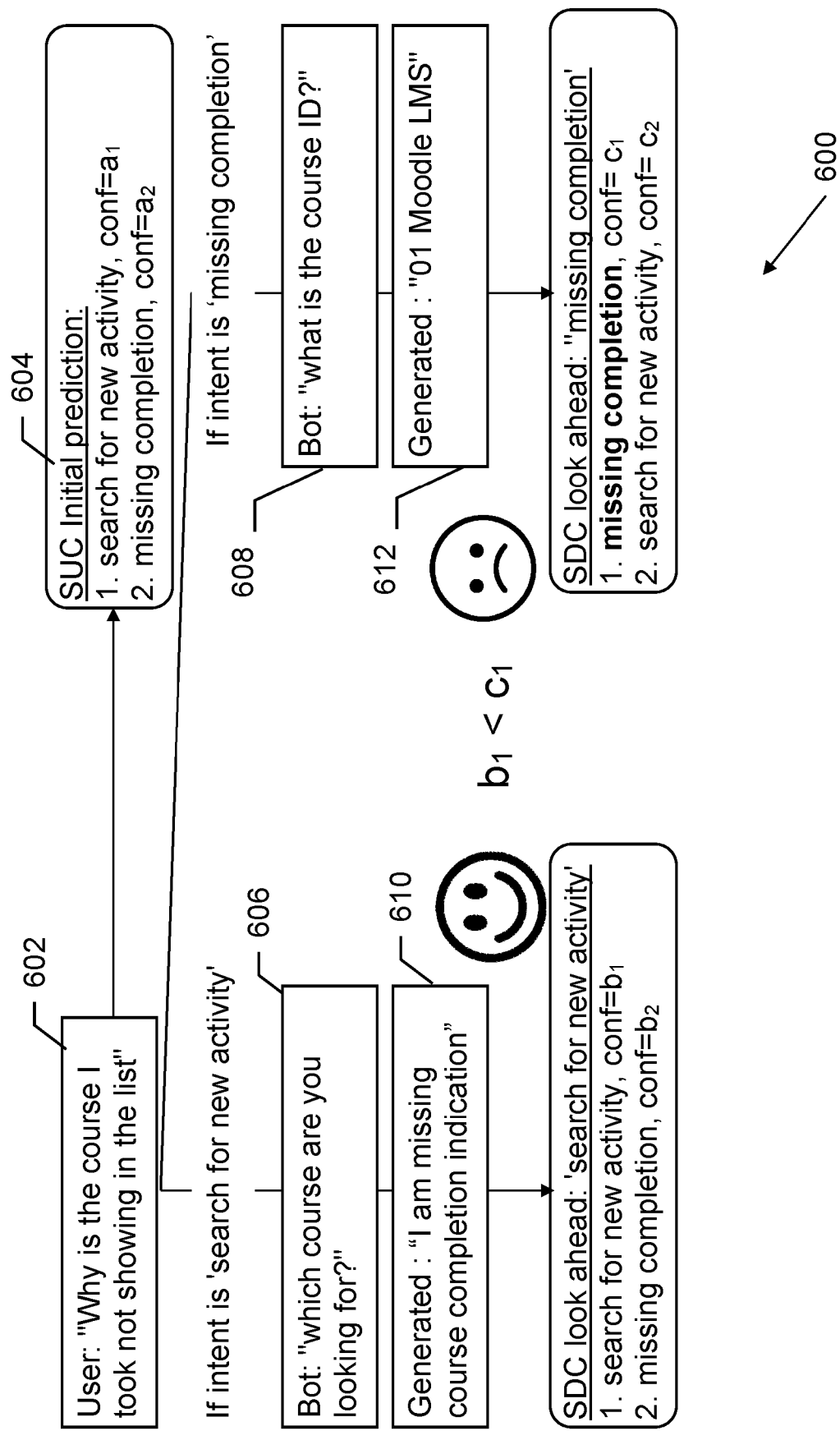
FIG. 6 is an exemplary illustration of third utterance generation to improve intent prediction via look ahead according to embodiments of the present techniques.

An example of a process 600 of using third utterance generation to improve intent prediction via look ahead is shown in FIG. 6. Process 600 begins with 602, in which a user makes an utterance such as "Why is the course I took not showing in the list". An initial SUC intent prediction 604 based only on the first utterance 602 may yield, for example, an intent prediction of "search for new activity", with an SUC confidence score of $a_1$, and an intent prediction of "missing completion", with an SUC confidence score of $a_2$, which is less than $a_1$.

At 606 and 608, the initial intent predictions may be used to cause the bot to generate alternative utterances. For example, for a predicted intent of "missing completion", the bot may generate 608 utterance "What is the course ID?", while for a predicted intent of "search for new activity", the bot may generate 606 an utterance "which course are you looking for?". The 3UGG process may be used for each alternative, 602 plus 606, and for 602 plus 608, to generate third utterances 610, 612. For example, generated third utterance 610 may be "I am missing course completion indication" and generated third utterance 612 may be "01 Moodle LMS" (a course ID). Then SDC confidence scores may be computed using all three utterances for each alternative and for each predicted intent. For example, SDC confidence score $b_1$ may be based on predicted intent "search for new activity" and utterances 602, 606, and 610, while SDC confidence score $b_2$ may be based on predicted intent "missing completion" and utterances 602, 606, and 610. In this example, $b_2$ may be less than $b_1$. Likewise, counterfactual (using lower confidence predicted intent) SDC confidence score $c_1$ may be based on predicted intent "missing completion" and utterances 602, 608, and 612, while counterfactual SDC confidence score $c_2$ may be based on predicted intent "search for new activity" and utterances 602, 608, and 612. In this example, $c_1$ may be less than $b_1$. Thus, the highest confidence outcome is based on predicted intent "missing completion" and utterances 602, 608, and 612.

Thus, generating a third utterance renders SDC performance superior to SUC, and makes it comparable to SDC working with three real utterances that are available retrospectively. Embodiments that utilize a generated third utterance benefit from generating successive user utterances and using them as a look-ahead signal during inference.

Figure 7:
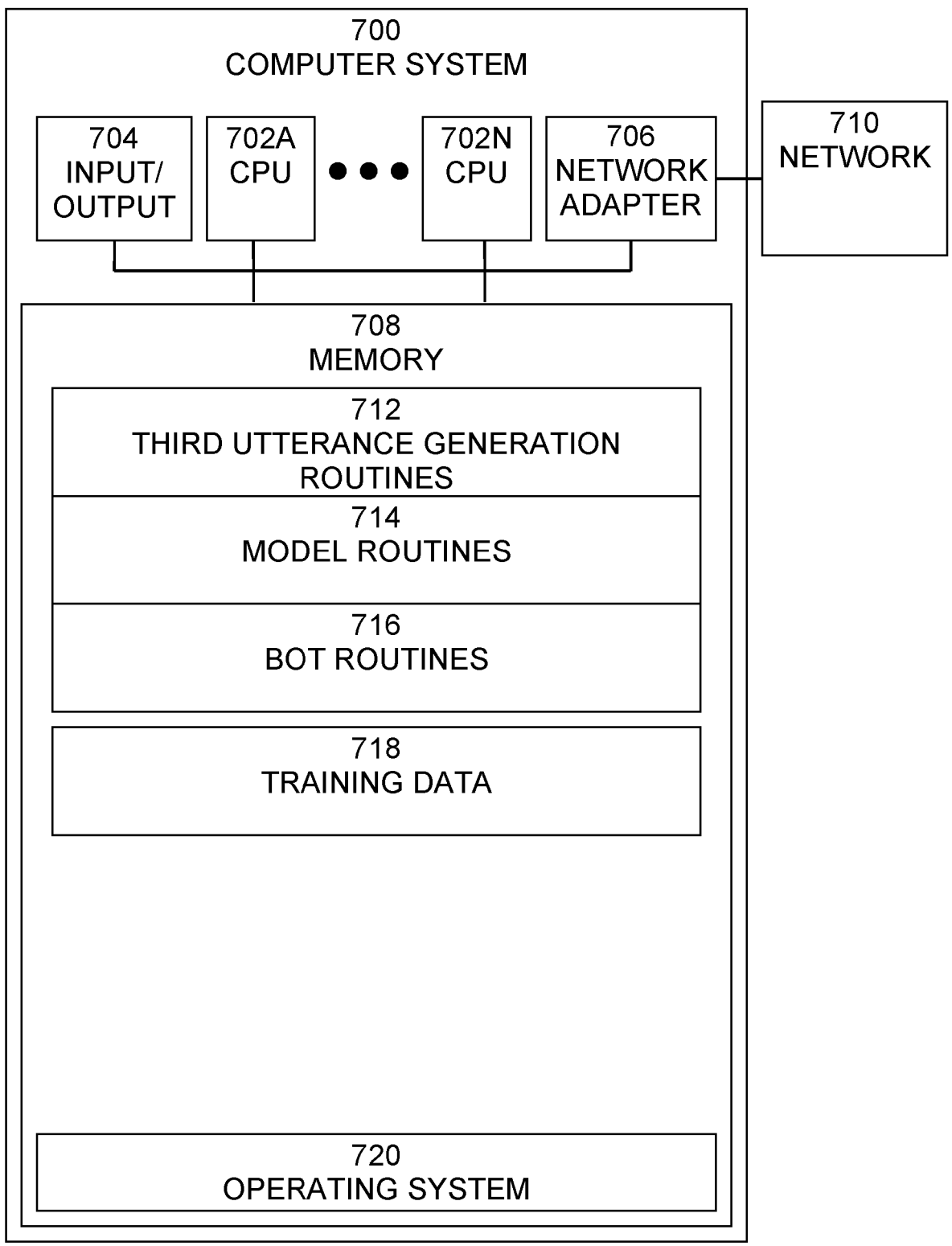
FIG. 7 is an exemplary block diagram of a computer system, in which processes involved in the embodiments described herein may be implemented.

An exemplary block diagram of a computer system 700, in which processes and components involved in the embodiments described herein may be implemented, is shown in FIG. 7. Computer system 700 may be implemented using one or more programmed general-purpose computer systems, such as embedded processors, systems on a chip, personal computers, workstations, server systems, and minicomputers or mainframe computers, or in distributed, networked computing environments. Computer system 700 may include one or more processors (CPUs) 702A-702N, input/output circuitry 704, network adapter 706, and memory 708. CPUs 702A-702N execute program instructions in order to carry out the functions of the present communications systems and methods. Typically, CPUs 702A-702N are one or more microprocessors, such as an INTEL CORE® processor. FIG. 7 illustrates an embodiment in which computer system 700 is implemented as a single multi-processor computer system, in which multiple processors 702A-702N share system resources, such as memory 708, input/output circuitry 704, and network adapter 706. However, the present communications systems and methods also include embodiments in which computer system 700 is implemented as a plurality of networked computer systems, which may be single-processor computer systems, multi-processor computer systems, or a mix thereof.

Input/output circuitry 704 provides the capability to input data to, or output data from, computer system 700. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 706 interfaces device 700 with a network 710. Network 710 may be any public or proprietary LAN or WAN, including, but not limited to the Internet.

Memory 708 stores program instructions that are executed by, and data that are used and processed by, CPU 702 to perform the functions of computer system 700. Memory 708 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 708 may vary depending upon the function that computer system 700 is programmed to perform. In the example shown in FIG. 7, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 7, memory 708 may include third utterance generation routines 712, model routines 714, bot routines 716, training data 718, and operating system 720. Third utterance generation routines 712 may include software to generate data such as enriched training data and third utterance generation, as described above. Model routines 714 may include software to provide text-to-text modeling functionality, as described above. Bot routines 716 may include software to implement an automated dialogue system, as described above. Operating system 718 may provide overall system functionality.

As shown in FIG. 7, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method, implemented in a computer system comprising a processor, memory accessible by the processor, and computer program instructions stored in the memory and executable by the processor, the method comprising:
   receiving, at a dialogue system, a first text utterance from a user;
   generating a plurality of second text utterances at the dialogue system in response to the received text utterance;
   generating a third text utterance based on each generated second text utterance using a trained deep neural network model;
   generating a score indicating an accuracy of predicting an intent of the user based on the first text utterance, one of the second text utterances, and the third text utterance based on the one of the second text utterances; and
   outputting to the user the second text utterance included in the conversation having the highest quality score.

2. The method of claim 1, further comprising selecting as a user intent the one of the predicted intents upon which the second text utterance included in the conversation having the highest quality score is based.

3. The method of claim 1, wherein the trained deep neural network model is trained using domain data including at least one of user-dialogue system conversation logs and user-human conversation logs.

4. The method of claim 1, wherein the trained deep neural network model is fine-tuned using at least one of intent prediction data, conversation assessment data, and generated third text utterances.

5. The method of claim 1, wherein the trained deep neural network model is fine-tuned using at least one of repetition of utterances, reordering of utterances, and escalation of a conversation.

6. A system comprising a processor, memory accessible by the processor, and computer program instructions stored in the memory and executable by the processor to perform:
- receiving, at a dialogue system, a first text utterance from a user;
- generating a plurality of second text utterances at the dialogue system in response to the received text utterance;
- generating a third text utterance based on each generated second text utterance using a trained deep neural network model;
- generating a score indicating an accuracy of predicting an intent of the user based on the first text utterance, one of the second text utterances, and the third text utterance based on the one of the second text utterances; and
- outputting to the user the second text utterance included in the conversation having the highest quality score.

7. The system of claim 6, further comprising selecting as a user intent the one of the predicted intents upon which the second text utterance included in the conversation having the highest quality score is based.

8. The system of claim 6, wherein the trained deep neural network model is trained using domain data including at least one of user-dialogue system conversation logs and user-human conversation logs.

9. The system of claim 6, wherein the trained deep neural network model is fine-tuned using at least one of intent prediction data, conversation assessment data, and generated third text utterances.

10. The system of claim 6, wherein the trained deep neural network model is fine-tuned using at least one of repetition of utterances, reordering of utterances, and escalation of a conversation.

11. A computer program product comprising a non-transitory computer readable storage having program instructions embodied therewith, the program instructions executable by a computer, to cause the computer to perform a method comprising:
- receiving, at a dialogue system, a first text utterance from a user;
- generating a plurality of second text utterances at the dialogue system in response to the received text utterance;
- generating a third text utterance based on each generated second text utterance using a trained deep neural network model;
- generating a score indicating an accuracy of predicting an intent of the user based on the first text utterance, one of the second text utterances, and the third text utterance based on the one of the second text utterances; and
- outputting to the user the second text utterance included in the conversation having the highest quality score.

12. The computer program product of claim 11, further comprising selecting as a user intent the one of the predicted intents upon which the second text utterance included in the conversation having the highest quality score is based.

13. The computer program product of claim 11, wherein the trained deep neural network model is trained using domain data including at least one of user-dialogue system conversation logs and user-human conversation logs.

14. The computer program product of claim 11, wherein the trained deep neural network model is fine-tuned using at least one of intent prediction data, conversation assessment data, and generated third text utterances.

15. The computer program product of claim 11, wherein the trained deep neural network model is fine-tuned using at least one of repetition of utterances, reordering of utterances, and escalation of a conversation.

* * * * *